3,160,628
Patented Dec. 8, 1964

3,160,628
6-METHYL-PREGNENES AND METHODS OF PREPARING THE SAME
John P. Dusza, Nanuet, N.Y., Joseph P. Joseph, Cliffside Park, N.J., and Seymour Bernstein, New City, N.Y., assignors to American Cyanamid Company, New York, N.Y., a corporation of Maine
No Drawing. Filed Aug. 15, 1961, Ser. No. 131,481
8 Claims. (Cl. 260—239.55)

This invention relates to new steroid compounds. More particularly, it relates to 6-methyl and 6-hydroxy-6-methyl steroids of the pregnane series, intermediates and methods for the preparation thereof.

The new steroids of the present invention can be illustrated by the following formula:

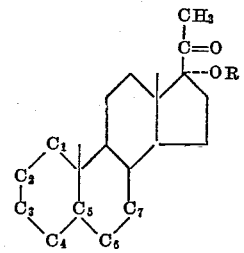

in which R is a member of the group consisting of hydrogen and lower alkanoyl radicals and

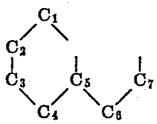

is a member of the group consisting of:

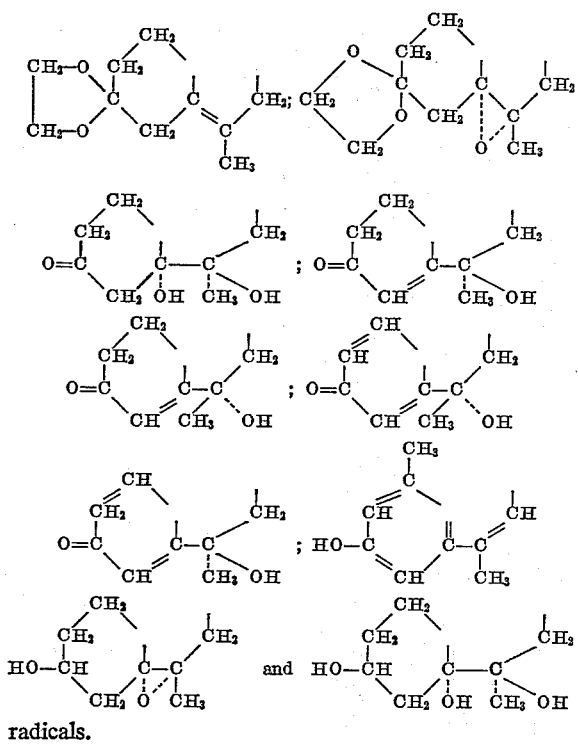

radicals.

The compounds of the present invention are, in general, solids which are comparatively insoluble in water and somewhat soluble in the usual organic solvents. They have relatively high melting points.

The present compounds are prepared, for example, by starting with 6α-methyl-17α-hydroxy-4-pregnene-3,20-dione (II) which is a commercially available progesterone derivative. The latter compound is heated with acetic anhydride in the presence of p-toluenesulfonic acid monohydrate to produce 3,17α-diacetoxy-6-methyl-3,5-pregnadien-20-one (III). This compound, when heated in a solvent, such as for example ether in the presence of N-monoperphthalic acid produces a mixture of 17α-acetoxy - 6β - hydroxy-6α-methyl-4-pregnene-3,20-dione and 17α-acetoxy - 6α - hydroxy-6β-methyl-4-pregnene-3,20-dione which can be separated by the use of chromatography. Saponification of the 17α-acetoxy compounds produces the corresponding 17α-hydroxy compounds.

The 17α - acetoxy-6β-hydroxy-6α-methyl-4-pregnene-3,20-dione (IV) is oxidized with 2,3-dichloro-5,6-dicyanobenzoquinone to produce 17α - acetoxy - 6β-hydroxy-6α-methyl-1,4-pregnadiene-3,20-dione (X). When the latter steroid is reacted with acetic anhydride in the presence of p-toluenesulfonic acid monohydrate the products obtained are 17α - acetoxy-6-methyl-1,4,6-pregnatriene-3,20-dione (XIII) and 3,17α - diacetoxy-1,6-dimethyl-19-nor-1,3,5-(10),6-pregnatetraen-20-one (XI). The latter on selective hydrolysis produces the corresponding 3-hydroxy steroid.

Other compounds of the present invention are prepared by reacting 17α-hydroxy-6α-methyl-4-pregnene-3,20-dione with ethylene glycol in the presence of paratoluenesulfonic acid which produces 3,20-bisethylenedioxy-6-methyl-5-pregnen-17α-ol (XIV). The latter compound when heated with monoperphthalic acid in the presence of a solvent produces 5α,6α - epoxy-3,20-bisethylenedioxy-6β-methylpregnan-17α-ol (XV).

The latter compound when reacted with perchloric acid in the presence of a solvent produces 5α,6β,17α-trihydroxy - 6α - methylpregnane-3,20-dione (XVI). On treatment with an alcoholic solution of an alkali metal at an elevated temperature the product 6β,17α-dihydroxy-6α-methyl-4-pregnene-3,20-dione is obtained (V). This is the same product as shown above obtained from 3,17α-diacetoxy-6-methyl-3,5-pregnadien-20-one (III).

Some of the present compounds can be prepared by heating 17α - acetoxy-3β-hydroxy-6-methyl-5-pregnen-20-one (XVII) with monoperphthalic acid in a solvent which produces 17α-acetoxy-5α,6α-epoxy-3β-hydroxy-6β-methylpregnan-20-one (XVIII). The latter compound when treated with perchloric acid gives 17α-acetoxy-3β,5α,6β-trihydroxy-6α-methylpregnan-20-one (XIX). The latter compound with treated with acidic chromic trioxide produces 17α - acetoxy-5α,6β-dihydroxy-6α-methylpregnane-3,20-dione (XX). This compound on treatment with hydrogen chloride produces 17α-acetoxy-6β-hydroxy-6α-methyl-4-pregnene-3,20-dione (IV) prepared above by other methods. When 17α-acetoxy-5α,6α-epoxy-3β-hydroxy-6β-methylpregnan-20-one (XVIII) is treated with hydrogen fluoride in a solvent and subsequently with acidic chromium trioxide the product 17α-acetoxy-5β-methyl-A-homo-B-nor-pregnane-3,4α,20-trione is obtained.

The following flowsheet shows the reactions described above which are also given in detail in the examples hereinafter.

FLOWSHEET
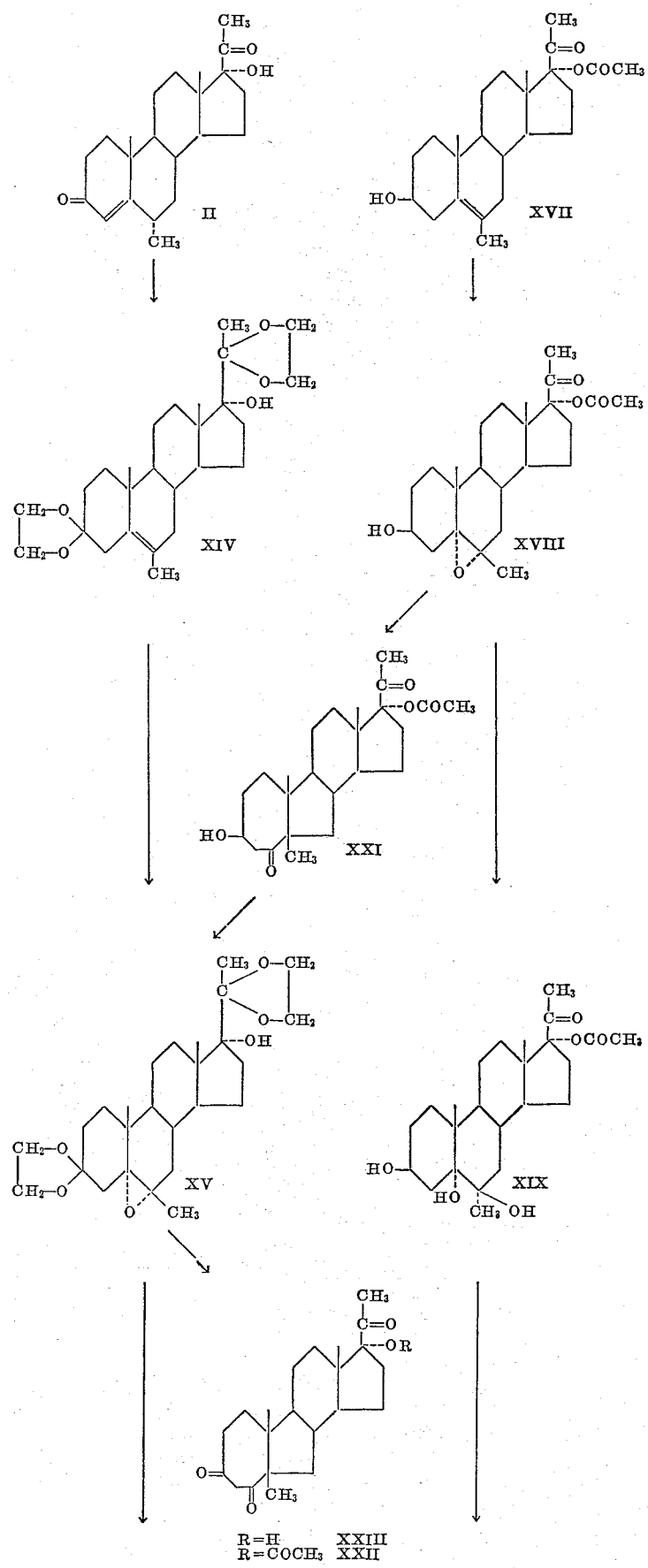

FLOWSHEET—Continued
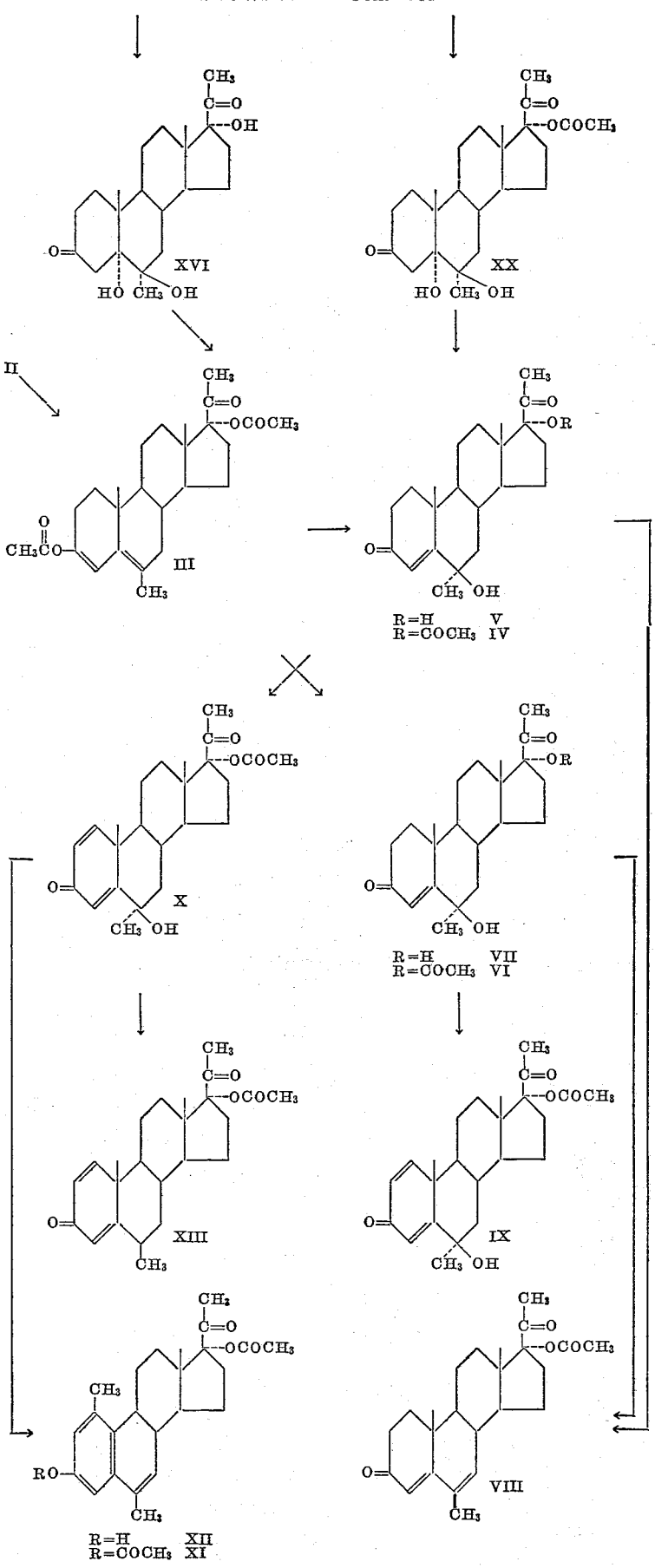

The compounds of the present invention are useful as progestational agents and as intermediates in preparing known progestational agents. For example, 17α-acetoxy-6α - hydroxy - 6β - methyl - 4 - pregnene-3,20-dione when treated with paratoluenesulfonic acid monohydrate produces 17α-acetoxy-6-methyl-4,6-pregnadiene-3,20-dione, a highly active progestational agent. Steroids having progestational activity are useful for the treatment of threatened and habitual abortion, dysmenorrhea, premenstrual tension and related disorders. The compounds can be incorporated into pharmaceutical forms such as pills, tablets, powders, suspensions, etc., by mixture with fillers, excipients, diluents and other means well known in the art of compounding pharmaceutically used medications.

The following examples describe in detail the preparation of compounds of the present invention. The temperatures used are centigrade unless otherwise indicated. Among the polar solvents found useful in the process of the present invention are dioxane and acetic acid.

Example 1

3,17α-DIACETOXY-6-METHYL-3,5-PREGNADIEN-20-ONE (III)

Ten grams of 6α-methyl-17α-hydroxy-4-pregnene-3,20-dione is added to 60 ml. of acetic anhydride and 1.0 g. of paratoluenesulfonic acid monohydrate. The reaction mixture is heated on a steam bath for one hour. After cooling the reaction mixture is poured into water and filtered. Recrystallization from methanol gives 9.0 g., melting point 162–165° C., $[\alpha]_D^{25}$ —132° (chloroform);

$$\lambda_{max.}^{MeOH} 234 \ m\mu \ (\epsilon 16,400)$$

Example 2

17α-ACETOXY-6β-HYDROXY-6α-METHYL - 4 - PREGNENE-3,20-DIONE AND 17α-ACETOXY-6α-HYDROXY-6β-METHYL-4-PREGNENE-3,20-DIONE (IV AND VI)

Two grams of 3,17α-diacetoxy-6-methyl-3,5-pregnadien-20-one is dissolved in 100 ml. of ether and refluxed for 3.5 hours with 16 ml. of 0.62 N monoperphthalic acid. The solution is cooled and washed with a dilute sodium bicarbonate solution and then a saturated saline solution. After drying, the ether is evaporated to give an oil which is chromatographed on diatomaceous earth (65 g.).

The crystalline fractions eluted with the petroleum ether + 15% acetone aliquots (5×100 ml.) are combined and recrystallized from acetone-petroleum ether to give 0.435 g., melting point 218–224° C. After two more recrystallizations from the same solvent pair, there is isolated 0.281 g. of the 6β-hydroxy epimer, melting point 226–228° C., $[\alpha]_D^{25} \pm 0°$ (choroform);

$$\lambda_{max.}^{MeOH} 238 \ m\mu \ (\epsilon 13,300)$$

After a break in the elution of crystalline material, a second fraction eluted by the later petroleum ether + 20% acetone aliquots (4×100 ml.) and the early petroleum ether + 30% acetone aliquots (2×100 ml.) is collected. Recrystallization from acetone-petroleum ether gives 0.343 g. of the 6α-hydroxy epimer, melting point 240–243° C. The melting point of this material is raised to 245–247° C. by a subsequent crystallization from the same solvent pair; $[\alpha]_D^{25}+5.5°$ (chloroform);

$$\lambda_{max.}^{MeOH} 243 \ m\mu \ (\epsilon 14,100)$$

Example 3

6α,17α-DIHYDROXY-6β-METHYL-4-PREGNENE-3,20-DIONE (VII)

A solution of 0.1 g. of 17α-acetoxy-6α-hydroxy-6β-methyl-4-pregnene-3,20-dione in 10 ml. of methanol and 0.5 ml. of 2.5% methanolic potassium hydroxide is refluxed for one hour under nitrogen. After neutralizing the reaction mixture with acetic acid, the solvent is partially removed at reduced pressure and the reaction mixture then poured into water. The precipitated diol is collected and recrystallized several times from acetone-petroleum ether to give 32 mg. of the pure diol, melting point 238–243° C. After drying under reduced pressure at 80° C. for 12 hours the melting point is raised to 245–247° C. $[\alpha]_D^{25}+51°$ (chloroform);

$$\lambda_{max.}^{MeOH} 242 \ m\mu \ (\epsilon 14,600)$$

Example 4

6β-17α-DIHYDROXY-6α-METHYL-4-PREGNENE-3,20-DIONE (V)

Fifty milligrams of 17α-acetoxy-6β-hydroxy-6α-methyl-4-pregnene-3,20-dione is dissolved in 20 ml. of methanol and 0.25 ml. of 2.5% methanolic potassium hydroxide is added. The solution is refluxed for one hour under nitrogen. The reaction mixture is neutralized with acetic acid and poured into water. Extraction of the aqueous solution with methylene chloride gives a solid, melting point 238–258° C. Recrystallization from acetone-petroleum ether gives 23 mg. of diol, melting point 266–270° C., $[\alpha]_D^{25} \pm 0°$ (chloroform);

$$\lambda_{max.}^{MeOH} 237 \ m\mu \ (\epsilon 13,100)$$

This material is identical with the diol prepared by the other method.

Example 5

17α-ACETOXY-6-METHYL-4,6-PREGNADIENE-3,20-DIONE (VIII)

(A) Two hundred and fifty milligrams of 17α-acetoxy-6α-hydroxy-6β-methyl-4-pregnene-3,20-dione is dissolved in a solution of 10 ml. of acetic acid, 2.5 ml. of acetic anhydride and 250 mg. of paratoluenesulfonic acid monohydrate. After standing overnight at room temperature, the reaction mixture is poured into water and filtered. Recrystallization of this material from acetone-petroleum ether gives 0.182 g. of the dienone, melting point 215–216° C., $[\alpha]_D+8.2°$ (chloroform);

$$\lambda_{max.}^{MeOH} 289 \ m\mu \ (\epsilon 24,200)$$

(B) Fifty milligrams of 17α-acetoxy-6α-hydroxy-6β-methyl-4-pregnene-3,20-dione is dissolved in 2.0 ml. of a 10% concentrated sulfuric acid-dioxane solution (wt./wt.). After standing at room temperature for 16 hours, the solution is diluted with a dilute sodium bicarbonate solution. The precipitated material is filtered and the material recrystallized from acetone-petroleum ether to give 35 mg. of the $\Delta^{4,6}$-3-one, melting point 214–215° C. Another crystallization of this material from the same solvent pair raises the melting point to 215–216° C. This is identical to material isolated in A.

Example 6

17α-ACETOXY-6-METHYL-4,6-PREGNADIENE-3,20-DIONE (VIII)

A solution of 0.25 g. of 17α-acetoxy-6β-hydroxy-6α-methyl-4-pregnene-3,20-dione in 2.5 ml. of acetic anhydride, 10.0 ml. of acetic acid and 250 mg. of paratoluenesulfonic acid monohydrate are allowed to stand at room tempearture for 17 hours. The reaction mixture is poured into water and filtered. Recrystallization of this material gives 0.181 g. of the $\Delta^{4,6}$-3-one, melting point 209–213° C., identical with the compound isolated in Example 5A.

Example 7

17α-ACETOXY-6α-HYDROXY-6β-METHYL-1,4-PREGNADIENE-3,20-DIONE (IX)

Three hundred milligrams of 17α-acetoxy-6α-hydroxy-6β-methyl-4-pregnene-3,20-dione is dissolved in 25 ml. of dry dioxane. To this solution is added 0.30 g. of 2,3-dichloro-5,6-dicyanobenzoquinone. The reaction mixture is refluxed for 20 hours. Upon cooling, the hydroquinone is separated by filtration and the filtrate evaporated to dryness. The residue is taken up in ethyl acetate and this solution is washed with water, cold 1% sodium hydroxide solution and saturated saline solution in that order. After drying the solution is evaporated to dryness and the residue crystallized from acetone-petroleum ether to give 0.165 g., melting point 271–273° C. After two more crystallizations the melting point is raised to 282–284°; $[\alpha]_D^{25}$—6.5° (chloroform);

$\lambda_{max.}^{MeOH}$ 245 m$\mu$ ($\epsilon$15,400)

Example 8

17$\alpha$-ACETOXY-6$\beta$-HYDROXY-6$\alpha$-METHYL-1,4-PREGNADIENE-3,20-DIONE (X)

A solution of 17$\alpha$-acetoxy-6$\beta$-hydroxy-6$\alpha$-methyl-4-pregnene-3,20-dione (1.5 g.) in 15 ml. of dioxane is oxidized with 1.06 g. of 2,3-dichloro-5,6-dicyanobenzoquinone by refluxing for 22 hours. Upon cooling the precipitated hydroquinone is filtered and the filtrate evaporated to dryness. The residue is taken up in ether, is washed with water, cold 1% aqueous sodium hydroxide solution and saturated saline solution in that order. After drying the ether is evaporated to give a crystalline residue which is recrystallized from acetone-petroleum ether to give a total of 0.945 g., melting point 239–241° C., $[\alpha]_D^{25}$—30° (chloroform);

$\lambda_{max.}^{MeOH}$ 244 m$\mu$ ($\epsilon$18,200)

Example 9

3,17$\alpha$ - DIACETOXY - 1,6 - DIMETHYL - 19 - NOR - 1,3,5(10),6-PREGNATETRAEN-20-ONE (XI) AND 17$\alpha$-ACETOXY - 6 - METHYL - 1,4,6 - PREGNATRIEN - 20 - ONE (XIII)

A mixture of 300 mg. of 17$\alpha$-acetoxy-6$\beta$-hydroxy-6$\alpha$-methyl-1,4-pregnadiene-3,20-dione, 10 ml. of acetic anhydride and 250 mg. of paratoluenesulfonic acid monohydrate is allowed to stand for 20 hours at room temperature. The reaction mixture is then poured into water and filtered to give 0.29 g. of a solid which is taken up in a minimum amount of benzene and chromatographed on diatomaceous earth. The material eluted with the last petroleum ether—2% acetone aliquot (25 ml.) and with the total petroleum ether—3% acetone aliquots (6×25 ml.) is combined and recrystallized from aqueous methanol to give 0.105 g., melting point 148–150° C. Another crystallization raises the melting point to 149–151° C., $[\alpha]_D^{25}$—111° (chloroform);

$\lambda_{max.}^{MeOH}$ 222, 228 and 265 m$\mu$ ($\epsilon$31,000, 28,300 and 8900); $\lambda_{max.}^{Basic\ MeOH}$ 238 and 322 m$\mu$ ($\epsilon$34,300 and 2460)

On further elution of the column there is obtained a second crystalline fraction eluted in last three petroleum ether+7% acetone aliquots (3×25 ml.) and the petroleum ether+10% acetone aliquots (6×25 ml.). Recrystallization of this combined material from acetone-petroleum ether gives 0.07 g., melting point 206–208° C. Another crystallization raises the melting point to 213–215° $[\alpha]_D^{25}$—29° (chloroform);

$\lambda_{max.}^{MeOH}$ 227, 252 and 304 m$\mu$ ($\epsilon$14,700, 11,200 and 9600)

The physical constants reported for a material assigned this structure are as follows, melting point 225–227° C., $[\alpha]_D^{25}$—38°;

$\lambda_{max.}^{EtOH}$ 228, 253 and 304 m$\mu$ ($\epsilon$13,500, 11,700 and 9120)

Example 10

17$\alpha$-ACETOXY-3-HYDROXY-1,6-DIMETHYL-19-NOR-1,3,5(10),6-PREGNATETRAEN-20-ONE (XII)

Sixty milligrams of 3,17$\alpha$-acetoxy-1,6-dimethyl-1,3,5(10),6-estratetraen-20-one is suspended in 10 ml. of methanol. Nitrogen is bubbled through the mixture to purge other gases and then 0.5 ml. of 10% aqueous potassium carbonate is added. The nitrogen is continued for 45 minutes and then the solution is neutralized with acetic acid. The solvents are removed under reduced pressure and the solid filtered to give 40 mg., melting point 240–245°. After two crystallizations from acetone-petroleum ether is obtained 32 mg. of the desired material, melting point 251–252° C., $[\alpha]_D^{30}$—92° (chloroform);

$\lambda_{max.}^{MeOH}$ 225, 265, 275 and 305 m$\mu$ ($\epsilon$27,700, 7400, 6100 and 2140); $\lambda_{max.}^{Basic\ MeOH}$ 237 and 322 m$\mu$ ($\epsilon$29,900 and 2200)

Example 11

3,20-BISETHYLENEDIOXY-6-METHYL-5-PREGNEN-17$\alpha$-OL (XIV)

17$\alpha$-hydroxy-6$\alpha$-methyl-4-pregnene-3,20-dione (1.1 g.) is dissolved in a solution of 50 ml. of benzene and 3.0 ml. of ethylene glycol. After the addition of 10 mg. of paratoluenesulfonic acid, the reaction mixture is refluxed with constant water removal for 24 hours. This is allowed to cool and then washed with aqueous sodium bicarbonate and water. Evaporation of the dried extract gives 1.2 g. of the bisketal as a white crystalline solid, melting point 213–218° C. Repeated crystallization from methanol raises the melting point to 224–226° C.

Example 12

5$\alpha$,6$\alpha$-EPOXY-3,20-BISETHYLENEDIOXY-6$\beta$-METHYL-PREGNAN-17$\alpha$-OL (XV)

One gram of 3,20-bisethylenedioxy-6-methyl-5-pregnen-17$\alpha$-ol is dissolved in 100 ml. of methylene chloride. This solution is refluxed with 10 ml. of 0.62 N monoperphthalic acid ether solution for three hours and then allowed to remain at room temperature overnight. The reaction mixture is freed of acids with an aqueous sodium bicarbonate solution. The organic layer in turn is washed with water until neutral and then dried with magnesium sulfate. Evaporation of the solvent leaves 0.44 g. of a white solid, melting point 259–262° C. Recrystallization of this material from acetone-petroleum ether raises the melting point to 262–265° C., $[\alpha]_D^{25}$+5.8° (chloroform).

Example 13

5$\alpha$,6$\beta$,17$\alpha$-TRIHYDROXY-6$\alpha$-METHYLPREGNANE-3,20-DIONE (XVI)

To a suspension of 0.1 g. of 5$\alpha$,6$\alpha$-epoxy-3,20-bisethylenedioxy-6$\beta$-methylpregnan-17$\alpha$-ol in 4 ml. of acetone is added 0.4 ml. of a 1.5 N perchloric acid solution. The suspended solid is dissolved on agitation and the reaction mixture is allowed to remain at room temperature for two hours. The solution is then neutralized with excess aqueous sodium bicarbonate. Evaporation of the organic solvent gives 80 mg. of the triol, melting point 220–235° C. Repeated crystallization of this material from absolute ethanol-petroleum ether (90–100° C.) gives 21 mg. of product, melting point 243–246° C., $[\alpha]_D^{25}$—21.2° (chloroform).

Example 14

6$\beta$,17$\alpha$-DIHYDROXY-6$\alpha$-METHYL-4-PREGNENE-3,20 DIONE (V)

(A) One milliliter of 2.5% methanolic potassium hydroxide is added to a solution of 224 mg. of 5$\alpha$,6$\beta$,17$\alpha$-trihydroxy-6$\alpha$-methylpregnane-3,20-dione in 10 ml. of methanol. After refluxing for one hour the solution is cooled, neutralized with acetic acid and evaporated to near dryness. The addition of water to the residue gives the solid diol product which is filtered and dried yielding 165 mg., melting point 266–270° C. Repeated crystallization from acetone-petroleum ether raises the melting point to 270–271° C., $\lambda_{max.}^{MeOH}$ 237–238 m$\mu$ (13,800); $\nu_{max.}^{KBr}$ 3500, 2930, 1700, 1680, 1610, 1380, 1360, 1230, 1145, 1125 and 1075 cm.$^{-1}$ (B) A solution of 128 mg. of 17$\alpha$-acetoxy-5$\alpha$,6$\beta$-dihydroxy-6$\alpha$-methylpregnane-3,20-dione in 5 ml. of methanol is refluxed for one hour with 0.5 ml. of 2.5% methanolic potassium hydroxide. The work up is identical to that above and recrystallization of the product then is obtained 25 mg. of the diol, melting point 271–274° C. This is identical to the material prepared by procedure A when a comparison of the infrared spectra is made.

Example 15

17α-ACETOXY-5α,6α-EPOXY-3β-HYDROXY-6β-METHYL-PREGNAN-20-ONE (XVIII)

To a solution of 500 mg. of 17α-acetoxy-3β-hydroxy-6-methyl-5-pregnen-20-one in 50 ml. of methylene chloride is added 5.0 ml. of 0.62 N monoperphthalic acid-ether solution. After refluxing for two hours, the solution is cooled and washed first with a saturated sodium bicarbonate solution and then water. The ether extract is dried over magnesium sulfate and then evaporated to dryness leaving a gum which becomes crystalline on trituration with ether. Repeated recrystallizations from acetone-petroleum ether gives 409 mg. of the desired oxide, melting point 204–207° C., $[\alpha]_D^{25} -48.3°$ (chloroform).

Example 16

17α-ACETOXY-3β,5α,6β-TRIHYDROXY-6α-METHYL-PREGNAN-20-ONE (XIX)

Five milliliters of 1.5 N perchloric acid is added to a solution of 1.5 g. of 17α-acetoxy-5α,6α-epoxy-3β-hydroxy-6β-methylpregnan-20-one in 60 ml. of acetone. After two hours at room temperature, the solution is neutralized with an aqueous sodium bicarbonate solution and the organic solvent removed under reduced pressure. Water is added to the resultant residue and the solid is collected by filtration. After washing thoroughly with water, the triol is dried to give 1.7 g. of material, melting point 220–230° C. The melting point is raised to 241–243° C. after repeated recrystallizations from acetone-petroleum ether; $[\alpha]_D^{25} -51.2°$ (chloroform).

Example 17

17α-ACETOXY-5α,6β-DIHYDROXY-6α-METHYLPREGNANE-3,20-DIONE (XX)

One gram of 17α-acetoxy-3β,5α,6β-trihydroxy-6α-methylpregnan-20-one is dissolved in 100 ml. of reagent acetone (distilled from potassium permanganate). Under a nitrogen atmosphere, 1.3 ml. of an 8 N chromic trioxide sulfuric acid solution is added to the above solution. After two minutes, the reaction mixture is pourned into water and the acetone removed at reduced pressure. The resulting white solid is filtered, washed with water and dried to give 0.74 g., melting point 247–250° C. Recrystallization from acetone-petroleum ether raises the melting point to 250–252° C., $[\alpha]_D^{25} -8.5°$ (chloroform).

Example 18

17α-ACETOXY-6β-HYDROXY-6α-METHYL-4-PREGNENE-3,20-DIONE (IV)

A stream of dry hydrogen chloride is passed through a solution of 0.2 g. of 17α-acetoxy-5α,6β-dihydroxy-6α-methylpregnane-3,20-dione in 50 ml. of methylene chloride maintained at 5° C. After 75 minutes the excess hydrogen chloride is removed by a stream of nitrogen bubbled through the reaction mixture. The methylene chloride solution is washed with an aqueous sodium bicarbonate solution and after also washing with water, it is dried over magnesium sulfate. Evaporation of the solvent under reduced pressure gives 112 mg. of a crystalline residue, melting point 188–190° C. Repeated crystallizations from acetone petroleum ether gives 47 mg., melting point 216–217° C. (dec.); $[\alpha]_D^{25} +1°$ (chloroform);

$\lambda_{max.}^{MeOH}$ 235 m$\mu$ ($\epsilon$14,400)

Example 19

17α-ACETOXY-3β-HYDROXY-5β-METHYL-A-HOMO-B-NOR-PREGNANE-4α,20-DIONE (XXI)

(A) A solution of 0.30 g. of 17α-acetoxy-5α,6α-epoxy-3β-hydroxy-6β-methylpregnan-20-one in 5.0 ml. of methylene chloride is cooled to −60° and to this is added a cooled solution (−60° C.) of 1.1 ml. of tetrahydrofuran, 0.5 ml. of methylene choloride and 0.8 ml. of anhydrous hydrogen fluoride. After being cooled at −5° C. for 5 hours, the solution is carefully poured into a saturated sodium bicarbonate solution. The organic phase is separated and the aqueous layer is extracted with methylene chloride. The combined organic solutions are washed with water and dried over magnesium sulfate. Evaporation of the organic solvent provides an amorphous residue which is disolved in a small amount of benzene and added to a column of 12 g. of a synthetic magnesium silicate. Elution with petroleum ether containing 3% acetone gives a crude crystalline material. Recrystallization from acetone-petroleum ether yields 118 mg., melting point 189–190° C. This melting point is raised to 194–196° C. on repeated crystallizations from the same solvent pair;

$\lambda_{max.}^{MeOH}$ none; $[\alpha]_D^{25} -29.6°$ (chloroform)

(B) Boron trifluoride in ether (20 ml.) is added to a solution of 1.9 g. of 17α-acetoxy-5α,6α-epoxy-3β-hydroxy-3β-methylpregnan-20-one in 100 ml. of ether and 100 ml. of benzene. After 18 hours the solution is neutralized with saturated sodium bicarbonate solution. The organic phase is separated, washed with water and dried over magnesium sulfate. Evaporation of the solvent gives a gum which is dissolved in anhydrous ether and seeded with material obtained from procedure A. In this manner 1.2 g. of crystalline product is obtained, melting point 174–184° C. Recrystallization from acetone-petroleum ether gives 0.62 g. melting point 195–197° C. The identity of this material and the product isolated in procedure A is established by infrared comparison.

Example 20

17α-ACETOXY-5β-METHYL-A-HOMO-B-NOR-PREGNANE-3,4α,20-TRIONE (XXII)

One hundred milligrams of 17α-acetoxy-3β-hydroxy-5β-methyl-A-homo-B-nor-pregnane - 4α,20 - dione is dissolved in 2.0 ml. of reagent acetone (distilled from potassium permanganate). An 8 N chromium trioxide-sulfuric acid solution is added dropwise to the reaction mixture until the orange color of the oxidizing agent persisted. The solution is poured into water and filtered. Two recrystallizations of the solid from acetone-petroleum ether provides 0.055 g., melting point 239–240° C. $[\alpha]_D^{25}$ −104° (chloroform);

$\lambda_{max.}^{Basic\ MeOH}$ 300 m$\mu$ ($\epsilon$18,000)

Example 21

17α-HYDROXY-5β-METHYL-A-HOMO-B-NOR-PREGNANE 3,4α,20-TRIONE (XXIII)

Two hundred milligrams of 5α,6α-epoxy-3,20-bisethylenedioxy-6β-methylpregnan-17α-ol is suspended in 8 ml. of acetone. Two drops of 72% perchloric acid is added and solution is effected immediately. After two hours at room temperature dilute sodium bicarbonate solution is added and the white solid which separates is collected by filtration and washed with water. This material is recrystallized from acetone-water several times to give 30 mg., melting point 194–196° C.; $[\alpha]_D^{25}$ −124° (chloroform);

$\lambda_{max.}^{Basic\ MeOH}$ + 300 m$\mu$ ($\epsilon$18,600)

We claim:
1. The compound 3,20 - bisethylenedioxy-6-methyl-5-pregnen-17α-ol.
2. The compound 5α,6α-epoxy-3,20-bisethylenedioxy-6β-methylpregnan-17α-ol.

3. The compound 3,17α-diacetoxy-1,6-dimethyl-19-nor-1,3,5(10),6-pregnatetraen-20-one.

4. The compound 17α-acetoxy-3-hydroxy-1,6-dimethyl-19-nor-1,3,5(10),6-pregnatetraen-20-one.

5. The compound 17α-acetoxy-5β-methyl-A-homo-B-nor-pregnane-3,4α,20-trione.

6. The compound 17α-acetoxy-3β-hydroxy-5β-methyl-A-homo-B-nor-pregnane-4α,20-dione.

7. The compound 17α-hydroxy-5β-methyl-A-homo-B-nor-pregnene-3,4α,20-trione.

8. A method which comprises treating 17α-acetoxy-6-hydroxy-6-methyl-1,4-pregnadiene-3,20-dione with para-toluenesulfonic acid and acetic anhydride and recovering therefrom 17α-acetoxy-6-methyl-1,4,6-pregnatriene-3,20-dione and 3,17α-diacetoxy-1,6-dimethyl-19-nor-1,3,5(10),6-pregnatetraen-20-one.

References Cited in the file of this patent

Mori: Chem. and Pharm. Bull. (Japan), vol. 9, April 1961, pages 328–332 (page 329 depended upon).